(12) United States Patent
Chu et al.

(10) Patent No.: US 10,191,209 B2
(45) Date of Patent: Jan. 29, 2019

(54) LIGHT GUIDE PLATE, BACKLIGHT MODULE AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Hanqi Chu, Beijing (CN); Site Cai, Beijing (CN); Jinmoo Park, Beijing (CN); Shounian Chen, Beijing (CN); Ming Fang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/907,389

(22) PCT Filed: Jul. 16, 2015

(86) PCT No.: PCT/CN2015/084173
§ 371 (c)(1),
(2) Date: Jan. 25, 2016

(87) PCT Pub. No.: WO2016/119411
PCT Pub. Date: Aug. 4, 2016

(65) Prior Publication Data
US 2016/0370538 A1  Dec. 22, 2016

(30) Foreign Application Priority Data

Jan. 28, 2015  (CN) .......................... 2015 1 0044962

(51) Int. Cl.
*G02B 6/00* (2006.01)
*F21V 8/00* (2006.01)

(52) U.S. Cl.
CPC ......... *G02B 6/0088* (2013.01); *G02B 6/0055* (2013.01)

(58) Field of Classification Search
CPC .............................. G02B 6/005; G02B 6/0088
(Continued)

(56) References Cited

U.S. PATENT DOCUMENTS

| 6,426,763 B1 | 7/2002 | Saaawa |
| 7,092,048 B2 * | 8/2006 | Jeong ................... G02B 6/0088 349/58 |

(Continued)

FOREIGN PATENT DOCUMENTS

| CN | 1252531 A | 5/2000 |
| CN | 1442734 A | 9/2003 |

(Continued)

OTHER PUBLICATIONS

International Search Report and Written Opinion both dated Oct. 13, 2015; PCT/CN2015/084173.

(Continued)

*Primary Examiner* — Julie A Bannan
(74) *Attorney, Agent, or Firm* — Ladas & Parry LLP

(57) ABSTRACT

A light guide plate, a backlight module and a display device is provided. The light guide plate includes: a film limit part and a fixed part. The film limit part is arranged on a light exiting surface of the light guide plate as a protruding structure, limiting an optical film arranged on the light exiting surface of the light guide plate. The fixed part is arranged on a side surface of the light guide plate as a bump structure to fix the light guide plate to a frame arranged on the side surface of the light guide plate. Issues of vibration (Continued)

friction between the light guide plate and the optical film and poor white spots can be solved effectively according to the present disclosure.

5 Claims, 2 Drawing Sheets

(58) Field of Classification Search
USPC .................................................. 362/627, 628
See application file for complete search history.

(56) References Cited

U.S. PATENT DOCUMENTS

| | | | | |
|---|---|---|---|---|
| 2002/0149712 | A1* | 10/2002 | Kitamura | G02B 6/0088 349/58 |
| 2003/0164913 | A1* | 9/2003 | Ogawa | G02B 6/0088 349/113 |
| 2004/0257494 | A1* | 12/2004 | Park | G02B 6/0088 349/65 |
| 2005/0259444 | A1* | 11/2005 | Choi | G02B 6/0088 362/633 |
| 2006/0061537 | A1* | 3/2006 | Yu | G02B 6/0088 345/102 |
| 2009/0147174 | A1 | 6/2009 | Ha et al. | |
| 2009/0290095 | A1 | 11/2009 | Ogawa | |
| 2013/0208504 | A1 | 8/2013 | Huang | |
| 2013/0263488 | A1 | 10/2013 | Wu et al. | |
| 2014/0003092 | A1* | 1/2014 | Takada | G02B 6/0093 362/624 |
| 2014/0092625 | A1* | 4/2014 | Lin | G02B 6/005 362/606 |
| 2014/0176872 | A1* | 6/2014 | Miyazaki | G02B 6/0088 349/65 |

FOREIGN PATENT DOCUMENTS

| | | |
|---|---|---|
| CN | 2791692 Y | 6/2006 |
| CN | 1912690 A | 2/2007 |
| CN | 1971371 A | 5/2007 |
| CN | 201163380 Y | 12/2008 |
| CN | 101452150 A | 6/2009 |
| CN | 201391804 Y | 1/2010 |
| CN | 202057924 U | 11/2011 |
| CN | 102691929 A | 9/2012 |
| CN | 202421531 U | 9/2012 |
| CN | 102749736 A | 10/2012 |
| CN | 202546521 U | 11/2012 |
| CN | 203204272 A | 9/2013 |
| CN | 103453386 A | 12/2013 |
| CN | 203838604 U | 9/2014 |
| CN | 104075192 A | 10/2014 |
| CN | 104763979 A | 7/2015 |
| JP | 2004-347957 A | 12/2004 |
| KR | 20130010209 A | 1/2013 |

OTHER PUBLICATIONS

First Chinese Office Action dated Apr. 25, 2017; Appln. No. 201510044962.1.
The Third Chinese Office Action dated May 30, 2018; Appln. No. 201510044962.1.
The Second Chinese Office Action dated Dec. 21, 2017; Appln. No. 201510044962.1.

* cited by examiner

LIGHT GUIDE PLATE, BACKLIGHT MODULE AND DISPLAY DEVICE

FIELD

Embodiments of the present invention relate to a light guide plate, a backlight module and a display device.

BACKGROUND

Since a liquid crystal display (LCD) panel is not a self-luminous, a conventional LCD device typically employs a backlight module as a backlight. A light guide plate (LGP) is an important component in the backlight module, and can convert a point light source or a line light source provided by the backlight source into a surface light source.

The traditional light guide plate is typically of flat-plate type, and disposed in the backlight module only as a pure optical member. A structure of the backlight module known to inventors is shown in FIG. 1, and an optical film 2 and a light guide plate 1 are separately and individually fixed in the backlight module. The optical film 2 is limited by a step structure of a frame 3. A shortcoming of such a backlight module is that, the light guide plate 1 and the optical film 2 are separately and individually fixed, which will cause the relative displacement between them during vibration in subsequent processing, thus easily causing vibration friction and poor white spots.

SUMMARY

Embodiments of the present disclosure provide a display device, a backlight and a display device.

One aspect of the embodiments of the present disclosure provides a light guide plate, comprising: a film limit part, arranged on a light exiting surface of the light guide plate and formed as a protruding structure to limit an optical film arranged on the light exiting surface of the light guide plate; and a fixed part, arranged on a side surface of the light guide plate and formed as a protruding structure to fix the light guide plate to a frame arranged on the side surface of the light guide plate.

Another aspect of the embodiments of the present disclosure provides a backlight module, comprising a light guide plate, an optical film arranged on a light exiting surface of the light guide plate and a frame arranged on a side surface of the light guide plate; the light guide plate including a film limit part and a fixed part; the film limit part arranged on the light exiting surface of the light guide plate and formed as a protruding structure to limit the optical film; the fixed part arranged on the side surface of the light guide plate and formed as a protruding structure to fix the light guide plate to the frame.

Another aspect of the embodiments of the present disclosure provides a display device, comprising the backlight module described above and a display panel arranged on the backlight module.

According to a light guide plate, a backlight module and a display device provided by embodiments of the present disclosure, the light guide plate comprises: a film limit part limiting an optical film and a fixed part fixing the light guide plate to a frame. The film limit part is arranged on a light exiting surface of the light guide plate. Such a light guide plate with the light guide plate as a structural part bearing and fixing the optical film can effectively reduce vibration friction between the light guide plate and the optical film and poor white spots. On the other hand, since the light guide plate replaces the plastic frame to bear the optical film, borders of the plastic frame can be further effectively thinned, and assembly of the backlight is simplified.

BRIEF DESCRIPTION OF THE DRAWINGS

In order to explain the technical solution in the embodiments of the present invention more clearly, the accompanying drawings needed to be used in the embodiments will be briefly introduced below. It is obvious that the drawings described below are only some embodiments of the present invention, and other drawings can also be obtained based on these drawings for those skilled in the art without any inventive work.

DETAILED DESCRIPTION

Figure 1:
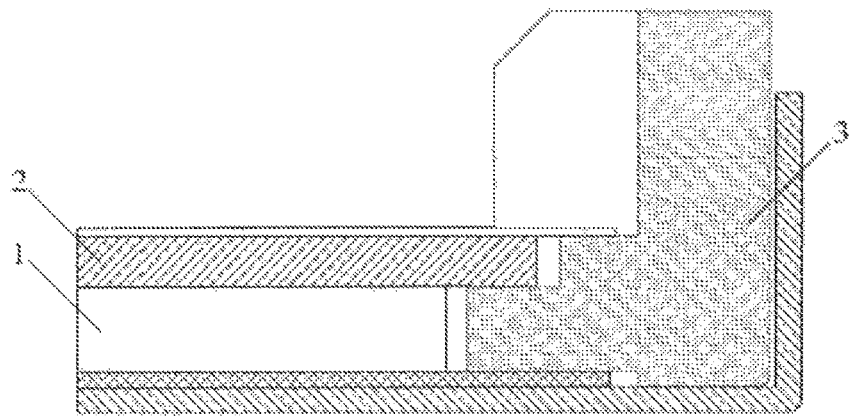
FIG. 1 is a local schematic view of a backlight module known to the inventor.

The technical solution of the embodiments of the present disclosure will be described clearly and fully in connection with the drawings of the embodiments of the present disclosure. It is obvious that the described embodiments are just a part but not all of the embodiments of the present disclosure. Based on the described embodiments of the present disclosure, those skilled in the art can obtain all other embodiments without any inventive work, which all fall into the scope of the claimed disclosure.

Unless otherwise defined, technical terms or scientific terms used herein shall have a common meaning known by those skilled in the art of the present disclosure. Terms and expressions such as "first", "second" and the like used in the description and claims of the patent application of the present disclosure do not denote any sequence, quantity or importance, but distinguish different components. Likewise, words such as "a", "an" and the like do not denote quantitative restrictions, but denote the presence of at least one. Words such as "connected", "connecting" and the like are not restricted to physical or mechanical connections, but can include electrical connections, regardless of direct or indirect connections. Words such as "up", "below", "left", "right", etc., are only used to denote the relative positional relationship. Upon the absolute position of the described object changes, the relative positional relationship change correspondingly. Thicknesses and shapes of various layers of films in the drawings do not reflect the true scale, which are just for purposes of illustrating schematically the contents of the present invention.

Figure 2:
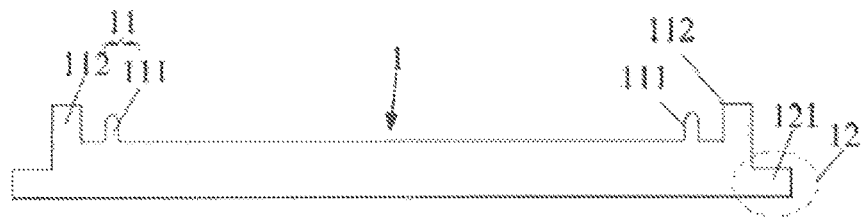
FIG. 2 is a cross-sectional view of a light guide plate provided by an embodiment of the present disclosure.

Embodiments of the present disclosure provide a light guide plate 1, as shown in FIG. 2, comprising a film limit part 11 and a fixed part 12.

The film limit part 11 is arranged on a light-exiting surface of the light guide plate 1 and formed as a protruding structure, limiting an optical film arranged on the light-exiting surface of the light guide plate.

The fixed part 12 is arranged on a side surface of the light guide plate 1 and formed as a protruding structure, fixing the light guide plate 1 to a frame (not shown) arranged on the side surface of the light guide plate.

The light guide plate provided by the embodiments of the present disclosure comprises the film limit part limiting the optical film and the fixed part fixing the light guide plate to the frame. The film limit part is arranged on the light-exiting surface of the light guide plate. Such the light guide plate as a structural part bears and fixes the optical film and can effectively reduce vibration friction between the light guide plate and the optical film and reduce poor white spots. On the other hand, since the light guide plate replaces the frame to bear the optical film, a border of the frame can be further effectively thinned, and assembly of the backlight is simplified.

It should be noted that, since the light guide plate can convert the point light source or the line light source being incident to the light guide plate to the surface light source and then make it to be emitted out, thus, in the embodiments of the present disclosure, a surface of the light guide plate from which light is emitted out is called the light-exiting surface (an upper surface of the light guide plate in FIG. 2). The light guide plate provided by the embodiments of the present disclosure may use a direct type point light source or a edge type line light source incident as a backlight source, in a case that the light guide plate uses the direct type point light source as the backlight source, the light from the backlight source enters the light guide plate from a bottom surface of the light guide plate, in a case that the light guide plate uses the edge type point light source as the backlight source, the light from the backlight source enters the light guide plate from a side surface of the light guide plate, the embodiments of the present disclosure will not limited it.

Further, as shown in FIG. 2, the film limit part 11 may include at least one limit pillar 111.

The at least one limit pillar 111 is arranged in a region of the light-exiting surface of the light guide plate corresponding to the optical film (not shown in FIG. 2). The number of the limit pillar 111 may be selected according to actual requirement, but it is not limited in the present disclosure, for example, in the embodiments of the present disclosure shown in FIG. 2, two limit pillars 111 are arranged on the light-exiting surface of the light guide plate.

Further, as shown in FIG. 2, the film limit part 11 may further include a bearing wall 112 which may be arranged at an edge of the light-exiting surface of the light guide plate 1, defining the optical film (not shown in FIG. 2).

Figure 3:
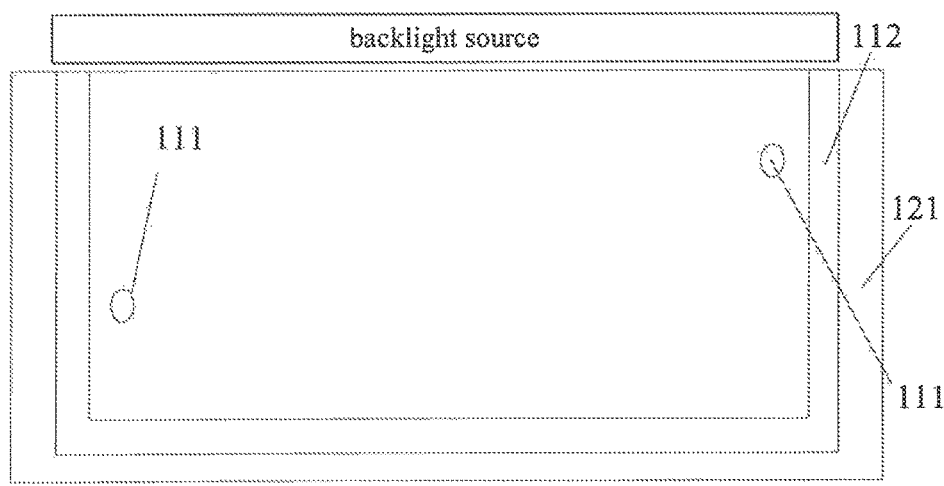
FIG. 3 is a front view of a light guide plate provided by an embodiment of the present disclosure.

For example, as shown in FIG. 3, for the edge type backlight source, the bearing wall 112 may be arranged on the other edges except the edge corresponding to an incident side of the light-exiting surface of the light guide plate 1. The incident side refers to a side of the light guide plate 1 facing the backlight source. In the rectangular light guide plate 1 shown in FIG. 3, a upper part of the light guide plate 1 is the incident side, and the edge corresponding to the incident side is a top edge of the light guide plate 1 in FIG. 3, and the bearing wall 112 is arranged on the other three edges except the top edge of the light guide plate 1. In this way, the optical film may be effectively enclosed and limited without affecting the incident light.

Certainly, only an example of the edge type backlight source is illustrated above. For the direct type backlight source, since the backlight is incident via an incident surface of the light guide plate 1, the bearing wall 112 may be arranged on all of the edges of the light-exiting surface of the light guide plate 1, thus enclosing and limiting the optical film in all directions.

It should be noted that, in the embodiments of the present disclosure, in a case where using the direct type backlight source, the backlight is incident via another surface opposite to the light-exiting surface of the light guide plate 1, thus the surface may be called the incident surface. The other surfaces except the incident surface and the light-exiting surface of the light guide plate 1 may be called a side surface of the light guide plate 1, and the edge corresponding to any of the side surfaces is an edge corresponding to the side surface of the light-exiting surface or the incident surface of the light guide plate.

According to such a light guide plate 1, a limit hole is formed at a position of the optical film corresponding to the limit pillar 111. During assembling, the optical film may be disposed within a scope defined by the bearing wall 112, and the limit hole is nested on the limit pillar 111, thus effectively avoiding the relative displacement between the optical film and the light guide plate 1, and the installation process is simple and convenient.

Further, as shown in FIG. 2, the fixed part 12 may include an engagement step 121. The engagement step 121 may be arranged on a side surface of the light guide plate 1.

Specifically, for the edge type backlight source, as shown in FIG. 3, the engagement step 121 may be arranged on the other side surfaces except the side surface corresponding to the incident side of the light guide plate. Similar to the embodiments described above, in the rectangular light guide plate 1 shown in FIG. 3, an upper part of the light guide plate 1 is the incident side, and a side surface corresponding to the incident side is a top side surface of the light guide plate 1 in FIG. 3, and the engagement step 121 may be arranged on the other three side surfaces except the top side surface of the light guide plate 1.

Similarly, for the direct type backlight source, since the backlight is incident from the incident surface of the light guide plate 1, thus the engagement step 121 may be arranged on all of the side surfaces of the light exiting surface of the light guide plate 1, enclosing and limiting the optical film in all directions.

In the actual production process, the engagement step of the light guide plate 1 and a main body of the light guide plate 1 may be integrally formed. As shown in FIG. 2, the engagement step 121 may be a step structure with a certain length formed by extending a bottom surface of the light guide plate 1, and a height of the engagement step 121 is less than a thickness of the main body of the light guide plate 1.

With such the light guide plate, the light guide plate is used as a structural part to bear and fix the optical film, thus, which can reduce vibration friction between the light guide plate and the optical film and decrease poor white spots. On the other hand, since the light guide plate replaces the frame to bear the optical film, a border of the frame can be further effectively thinned, and assembly of the backlight is simplified.

Figure 4:
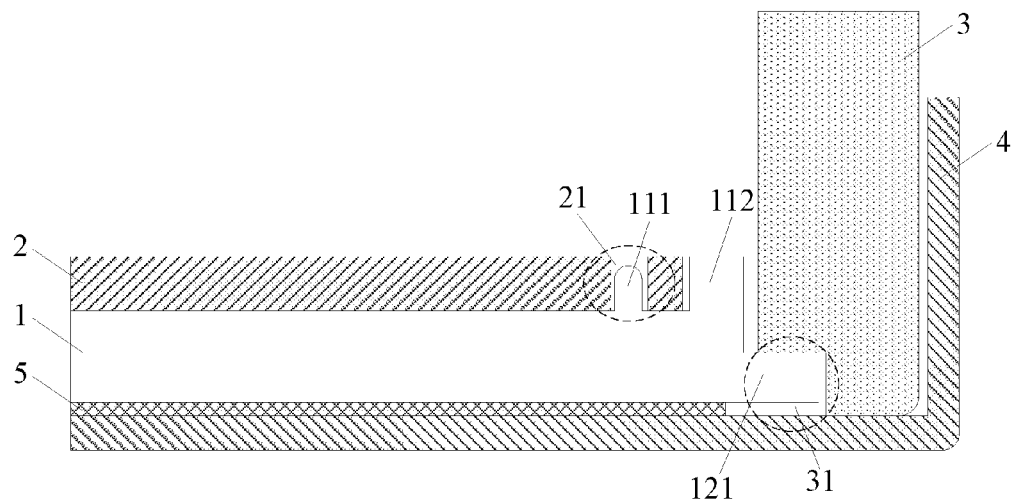
FIG. 4 is a local schematic view of a backlight module provided by an embodiment of the present disclosure.

As shown in FIG. 4, a backlight module provided by embodiments of the present disclosure comprises the light guide plate 1 described above, the optical film 2 and the frame 3.

The light guide plate 1 includes the film limit part 11 and the fixed part 12. The film limit part 11 is arranged on the light exiting surface of the light guide plate 1 and formed as a protruding structure to limit the optical film 2. The fixed part 12 is arranged on a side surface of the light guide plate 1 and formed as a protruding structure to fix the light guide plate 1 to the frame 3.

The backlight module provided by the embodiments of the present disclosure comprises the light guide plate which includes the film limit part limiting the optical film and the fixed part fixing the light guide plate to the frame. The film limit part is arranged on the light exiting surface of the light guide plate. With the backlight module comprising the light guide plate with such a structure, the light guide plate is used as a structural part to bear and fix the optical film, which can effectively reduce vibration friction between the light guide plate and the optical film and decrease poor white spots. On the other hand, since the light guide plate replaces the frame to bear the optical film, a border of the frame can be further effectively thinned, and assembly of the backlight is simplified.

The structure of the light guide plate is detailed in the embodiments described above, which is not repeated herein.

Further, as shown in FIG. 4, the backlight module further includes a backlight source (not shown in FIG. 4), a back plate 4 and a reflective layer 5.

For example, for the edge type backlight source, the backlight source may be arranged on an end of the light guide plate 1. The back plate 4 partly encloses the light guide plate 1 to provide supporting. The reflective layer 5 is arranged between the back plate 4 and the light guide plate 1. Certainly, an example is only for illustrating, however, the backlight module provided by the embodiments of the present disclosure may use any one of known backlight module structures, which is not limited in the present disclosure.

Further, as shown in FIG. 4, in a case where the light guide plate 1 includes at least one limit pillar 111, the optical film 2 includes at least one limit hole 21 accordingly arranged corresponding to at least one limit pillar 111.

In addition, in a case where the fixed part 12 of the light guide plate 1 includes the engagement step 12, the frame 3 includes an engagement groove 31 accordingly arranged corresponding to the engagement step 121.

With the backlight module with such the structure, the light guide plate is used as a structural part to bear and fix the optical film, which can effectively reduce vibration friction between the light guide plate and the optical film and decrease poor white spots. On the other hand, since the light guide plate replaces the frame to bear the optical film, a border of the frame can be further effectively thinned, and assembly of the backlight is simplified.

Figure 5:
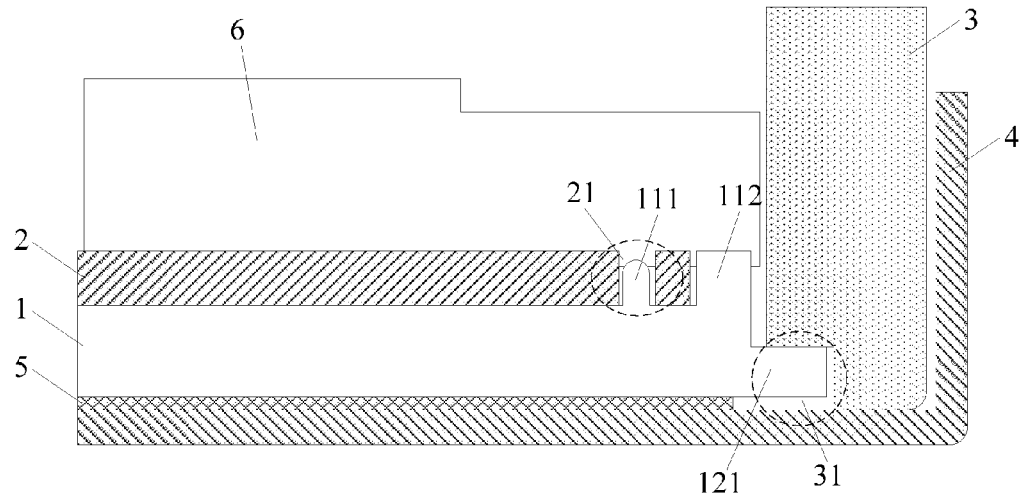
FIG. 5 is a local schematic view of a display device provided by an embodiment of the present disclosure.

As shown in FIG. 5, a display device provided by embodiments of the present disclosure comprises the backlight module described above and a display panel 6 arranged above the backlight module.

It should be noted that the display device may be: a liquid crystal panel, an electronic paper, a mobile phone, a tablet computer, a television, a display, a notebook computer, a digital picture frame, a navigator and any products or components having the display function.

A display device provided by the embodiments of the present disclosure comprises a backlight module, and the backlight module includes a light guide plate which includes a film limit part limiting an optical film and a fixed part fixing the light guide plate to a frame. The film limit part is arranged on the light exiting surface of the light guide plate. With the backlight module with such the structure, the light guide plate is used as a structural part to bear and fix the optical film, which can effectively reduce vibration friction between the light guide plate and the optical film and decrease poor white spots. On the other hand, since the light guide plate replaces the frame to bear the optical film, a border of the frame can be further effectively thinned, and assembly of the backlight is simplified.

The above embodiments are only for illustrating the present disclosure, and not intended to limit the present disclosure. Those skilled in the art can make various variations and modifications without departing from the spirit and scope of the present disclosure, so all equivalent technical solutions also fall into the scope of the present disclosure. It is intended that the scope of the present disclosure should be defined by the claims appended.

What is claimed is:

1. A light guide plate, comprising: a film limit portion, arranged on a light exiting surface of the light guide plate and formed as a protruding structure to limit an optical film arranged on the light exiting surface of the light guide plate; and a fixed part, continuously extending along a# the length of three side surfaces of the light guide plate and formed as a protruding structure to fix the light guide plate to a frame arranged on the side surfaces of the light guide plate, wherein the fixed part includes an engagement step, arranged continuously along the length of three side surfaces of the light guide plate and has a height which is less than a thickness of the light guide plate, the engagement step is formed by extending a bottom surface of the light guide plate and the engagement step is protruded toward a frame with an engagement groove for engagement thereto, wherein the film limit portion comprises at least one limit pillar, the at least one limit pillar is arranged in a region corresponding to the optical film of the light exiting surface of the light guide plate, wherein the film limit portion further includes a bearing wall partially surrounding the optical film and being continuous, the bearing wall is arranged at an edge except the edge corresponding to the incident side of the light guide plate of the light exiting surface of the light guide plate.

2. A backlight module, comprising a light guide plate, an optical film arranged on a light exiting surface of the light guide plate and a frame arranged on side surfaces of the light guide plate; the light guide plate including a film limit portion and a fixed part; the film limit portion arranged on the light exiting surface of the light guide plate and formed as a protruding structure to limit the optical film; the fixed part continuously extending along the length of three side surfaces of the light guide plate and formed as a protruding structure to fix the light guide plate to the frame, wherein the fixed part includes an engagement step, the engagement step is arranged continuously along the three side surfaces of the light guide plate and has a height which is less than a thickness of the light guide plate, the frame includes an engagement groove arranged corresponding to the engagement step and engaged with the engagement step, the engagement step is formed by extending a bottom surface of the light guide plate and the engagement step is protruded toward the engagement groove of the frame, and the engagement step engages the engagement groove of the frame, wherein the film limit portion of the light guide plate includes at least one limit pillar, wherein the film limit portion further includes a bearing wall partially surrounding the optical film and being continuous, the bearing wall is arranged at an edge except the edge corresponding to the incident side of the light guide plate of the light exiting surface of the light guide plate.

3. The backlight module according to claim 2, further comprising a backlight source providing light for the light guide plate, a back plate partly enclosing the light guide plate to provide supporting and a reflective layer arranged between the light guide plate and the back plate.

4. The backlight module according to claim 2, wherein the optical film includes at least one limit hole corresponding to the at least one limit pillar so that the at least one limit pillar is inserted into the at least one limit hole.

5. A display device, comprising the backlight module of claim 2 and a display panel arranged on the backlight module.

\* \* \* \* \*